United States Patent
Beato

(10) Patent No.: US 9,626,582 B2
(45) Date of Patent: Apr. 18, 2017

(54) SYSTEM AND METHOD FOR MEASURING MOBILE DOCUMENT IMAGE QUALITY

(71) Applicant: Kodak Alaris Inc., Rochester, NY (US)

(72) Inventor: Louis Beato, Rochester, NY (US)

(73) Assignee: KODAK ALARIS INC., Rochester, NY (US)

( * ) Notice: Subject to any disclaimer, the term of this patent is extended or adjusted under 35 U.S.C. 154(b) by 81 days.

(21) Appl. No.: 14/586,285

(22) Filed: Dec. 30, 2014

(65) Prior Publication Data

US 2016/0188993 A1 Jun. 30, 2016

(51) Int. Cl.
*G06K 9/46* (2006.01)
*G06K 9/62* (2006.01)
*G06T 7/00* (2017.01)

(52) U.S. Cl.
CPC .............. *G06K 9/46* (2013.01); *G06K 9/4652* (2013.01); *G06K 9/4661* (2013.01); *G06K 9/627* (2013.01); *G06K 9/6267* (2013.01); *G06T 7/0002* (2013.01); *G06K 2009/4666* (2013.01); *G06T 2207/10004* (2013.01); *G06T 2207/30168* (2013.01)

(58) Field of Classification Search
CPC .... G06K 9/2018; G06K 9/4652; G06T 7/408; G06T 5/001; G06T 2207/10024; G06T 11/001; H04N 1/38; H04N 1/40012; H04N 1/56; H04N 1/60; H04N 1/62; H04N 1/644; H04N 9/88
See application file for complete search history.

(56) References Cited

U.S. PATENT DOCUMENTS 9,070,192 B1 * 6/2015 Smith .................. G06K 9/4652
2015/0154742 A1 6/2015 Bocharov et al.

OTHER PUBLICATIONS

Anonymous: "Image Enhancement and Verification Tools—ABBYY Mobile Imaging SDK," Jul. 13, 2014, retrieved from the internet: http://wayback.archive.org/web/20140713123145/http://www.abbyy.com/mobile_imaging_sdk/description, the whole document.
Anonymous: "ABBYY mobile image processing, recognition and data capture technologies," Jun. 12, 2012, retrieved from the internet: http://wayback.archive.org/web/20120906092429/http://www.abbyy.com/solutions/mobile/features, the whole document.
Yuko Roodt et al., "Robust single image noise estimation from approximate local statistics," Proceedings of the Twenty-Third Annual Symposium of the Pattern Recognition Association of South Africa, Nov. 29, 2012, retrieved from the internet: http://www.prasa.org/proceedings/2012/prasa2012-08.pdf, section II Noise Estimation.
International Search Report and Written Opinion dated Jun. 16, 2016 in corresponding Patent Cooperation Treaty patent application No. PCT/US2015/067580.

* cited by examiner

*Primary Examiner* — Duy M Dang
(74) *Attorney, Agent, or Firm* — Hogan Lovells US LLP

(57) ABSTRACT

A system and method for detecting the quality of a captured digital image depicting a hardcopy document are disclosed. The captured digital image is analyzed to determine a corresponding blurriness, noise, hotspot, and uneven illumination metric representing a quality level of the image data. The blurriness, noise, hotspot, and uneven illumination metrics are then combined to formulate a pass/caution/fail indicator for the user to respond to the captured digital image quality.

28 Claims, 13 Drawing Sheets

*Noise*

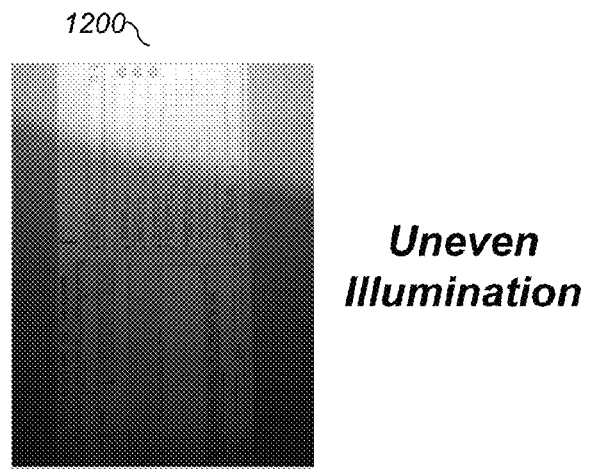
*Uneven Illumination*
FIG. 12
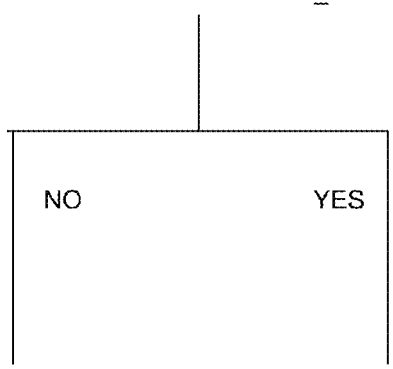
Is MaximumPixelValue >= MAX_THRESHOLD
NO    YES
PASS = No          FAIL = Uneven Illumination
Uneven Illumination

Uneven Illumination
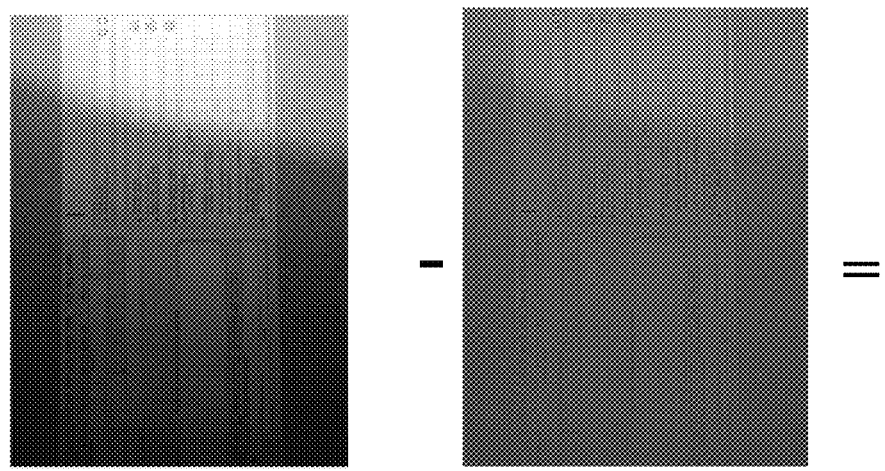
Input  −  [Input + CorrectionFactor*(Input_Blurred_mean − Input_Blurred)]  =
FIG. 13
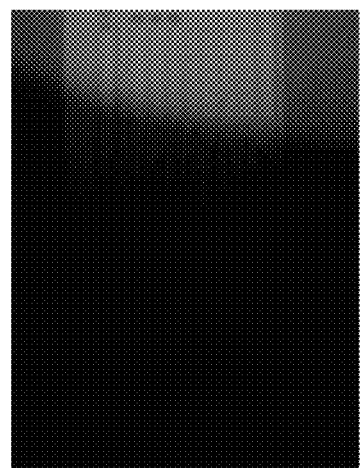
Difference Residual =   Input − [Input + CorrectionFactor*(Input_Blurred_mean − Input_Blurred)]
Max = 120.0
(failure)

SYSTEM AND METHOD FOR MEASURING MOBILE DOCUMENT IMAGE QUALITY

FIELD OF THE INVENTION

This invention pertains to the field of digital imaging, and more particularly to a method for evaluating the quality of a document within a digital image captured on a mobile device or camera.

BACKGROUND OF THE INVENTION

Digital cameras offer significant advantages over scanners for capturing document images and other images. Digital cameras are generally more portable than scanners, allowing users to image documents wherever they are and as the need arises rather than having to bring the document to a scanner. In addition, because scanners require that the document to be digitized be placed on a scanner platen, digital cameras are capable of capturing images of a wider variety of document types (e.g., larger documents or documents mounted in a frame) than scanners. However, the use of digital cameras creates difficulties that do not exist when using a scanner. For example, lighting conditions vary when using a digital camera, whereas the lighting conditions are generally controlled for scanners. In addition, use of a digital camera can introduce geometric distortions depending on various factors such as the angle and distance of the digital camera relative to the document, the lens used by the digital camera, and whether the document is situated on a flat or curved surface. Because scanners generally utilize a moving scanner head, at a fixed distance from a document which is held flat on the platen, these distortions do not typically occur in scanners. Another difficulty in capturing images of documents with a digital camera is the wide variety of different possible background shapes, patterns and colors.

Digital cameras (in particular, those included in mobile phones, smartphones, tablets, and other mobile devices) typically have a relatively small preview display as part of the device. This small screen makes it difficult for a user to assess the quality of the captured document by using the preview screen. Although the device display in many smartphones also acts as the preview or display screen for captured images, these screens may still be too small for a user to determine whether an image of a document is sufficient for the desired post-processing through visual inspection.

A typical application applied to scanned documents is using optical character recognition (OCR) to extract ASCII data for use later, such as indexing the document. Blurriness, noise, and uneven illumination will have a negative effect on the ability to OCR a document capture with a digital camera. Another problem is that flash use during image capture with a digital camera can cause a hotspot problem where part of the captured image data is obscured due to the flash. What is needed is a way to measure and analyze blurriness, noise, hotspot, and uneven illumination at the time of capture so the user can be alerted to re-capture the document with the digital camera.

SUMMARY OF THE INVENTION

The present invention is directed to a system and method for measuring the quality of a captured digital image of a document, and in particular to measuring the quality of documents captured with a digital camera and generating an alert or instruction to re-capture the image of the document if it is not sufficient for desired further processing, such as OCR recognition. The digital camera may be included in a smartphone, tablet, or other portable device. When included in a digital smartphone, tablet, or other portable device, the system and method may be implemented as part of an application program executed by the device. The application program may be programmed to control functionality of the camera. The application may then analyze any images captured, as described in more detail below, and alert the user if the captured image of the document is insufficient for desired later processing. This same functionality may be provided within programming on a conventional digital camera, either as a standard feature or a selectable option. Alternatively, the processing and analysis could be done on a separate computing device that receives the image, either through a networked cloud computing environment or direct transfer from the camera to a memory associated with the device.

In addition to analyzing documents, the system and method described herein may be used to detect the same types of defects in conventional photographs taken with a digital camera. Similar alerts could be provided to suggest that the user re-take the photograph.

Using the digital camera or other digital imaging system, a digital image is captured that depicts a hardcopy document on a background. The digital image may be color, black and white, or grayscale. When capturing a color image, the color digital image may include image data for a plurality of color channels, which are analyzed to determine a quality metric, representing a measure of the ability to extract information from the image data. The image data for the plurality of color channels is then converted to a gray scale equivalent. When the captured image is grayscale or black and white, conversion may not be necessary, although these images are also analyzed to determine the quality metric. The processor within the digital camera, or mobile device including a digital camera, further analyzes the image data for the metrics of blurriness, noise, uneven illumination, and hotspot to detect the quality of the depicted hardcopy document. After the metrics have been determined, the processor stores an indication of the document quality metrics in a processor-accessible memory. The quality measurements are analyzed by the processor to insure a usable document image was obtained at the time of capture that can then be used to extract information using optical character recognition.

If the processing determines that the image is not of sufficient quality, an alert can be provided to the operator indicating that the document should be re-captured. This process can be repeated until an image of the document is obtained that is determined to be of sufficient quality to perform the desired post-capture processing on the image, such as OCR recognition.

BRIEF DESCRIPTION OF THE DRAWINGS

FIG. 12 depicts an example of an image with uneven illumination, and shows the processing steps that are used to calculate the uneven metric in the method of FIG. 2.

FIG. 13 illustrates an example of uneven illumination and the creation of a residual image by adding a fraction of a mean-blurred image plane to the stored gray scale image plane.

DETAILED DESCRIPTION OF THE INVENTION

Figure 1:
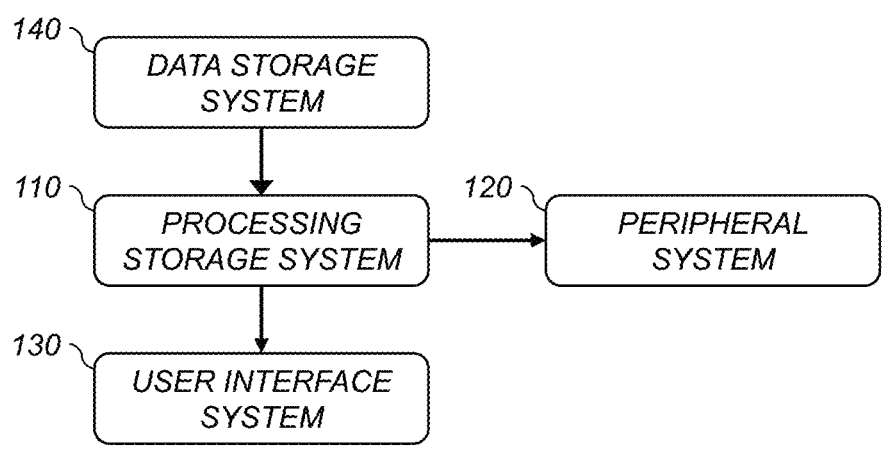
FIG. 1 is a high-level diagram showing the components of a system for processing a captured digital image.

FIG. 1 is a high-level diagram showing the components of a digital camera system for capturing and processing images. The system includes a data processing system 110, a peripheral system 120, a user interface system 130, and a data storage system 140. The peripheral system 120, the user interface system 130 and the data storage system 140 are communicatively connected to the data processing system 110. These systems may be included within a digital camera, or within a mobile device that contains a digital camera, such as a smartphone, tablet, or PDA. Alternatively, the images from a digital camera may be transmitted to a separate system for processing. For example, the digital camera may transmit images to a server on a cloud computing network. The server may process the images, and transmit a determination of image quality back to the digital camera.

The data processing system 110 includes one or more data processing devices that implement the processes of the various embodiments of the present invention, including the example processes described herein. The data processing devices may be, for example, a central processing unit ("CPU"), a desktop computer, a laptop computer, a mainframe computer, a personal digital assistant, a smartphone, a tablet, a digital camera, cellular phone, or any other device for processing data, managing data, or handling data. The processor system 110 may also include an OCR engine for converting the captured image of the document to text.

The data storage system 140 includes one or more processor-accessible memories configured to store information, including software instructions executed by the processor and captured image data. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The processor-accessible memory may be any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The system components may be communicatively connected in any manner that enables transmissions of data between components, including wired or wireless transmissions between devices, data processors, or programs in which data may be communicated. This connection may include a connection between devices or programs within a single data processor, a connection between devices or programs located in different data processors, and a connection between devices not located in data processors at all. In this regard, although the data storage system 140 is shown separately from the data processing system 110, the data storage system 140 may be stored completely or partially within the data processing system 110. Further in this regard, although the peripheral system 120 and the user interface system 130 are shown separately from the data processing system 110, one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140. The peripheral system 120 does not need to be external to the digital camera device that includes the data processing system 110, user interface system 130, and data storage system 140. For example, the peripheral system could be the camera components within a smartphone, or the digital video capture component's in a conventional digital camera.

The user interface system 130 may include a touch screen, touch pad, keypad, mouse, keyboard, another computer, or any device or combination of devices from which data is input to the data processing system 110. In this regard, and as noted above, although the peripheral system 120 is shown separately from the user interface system 130, the peripheral system 120 may be included as part of the user interface system 130. The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

Figure 2:
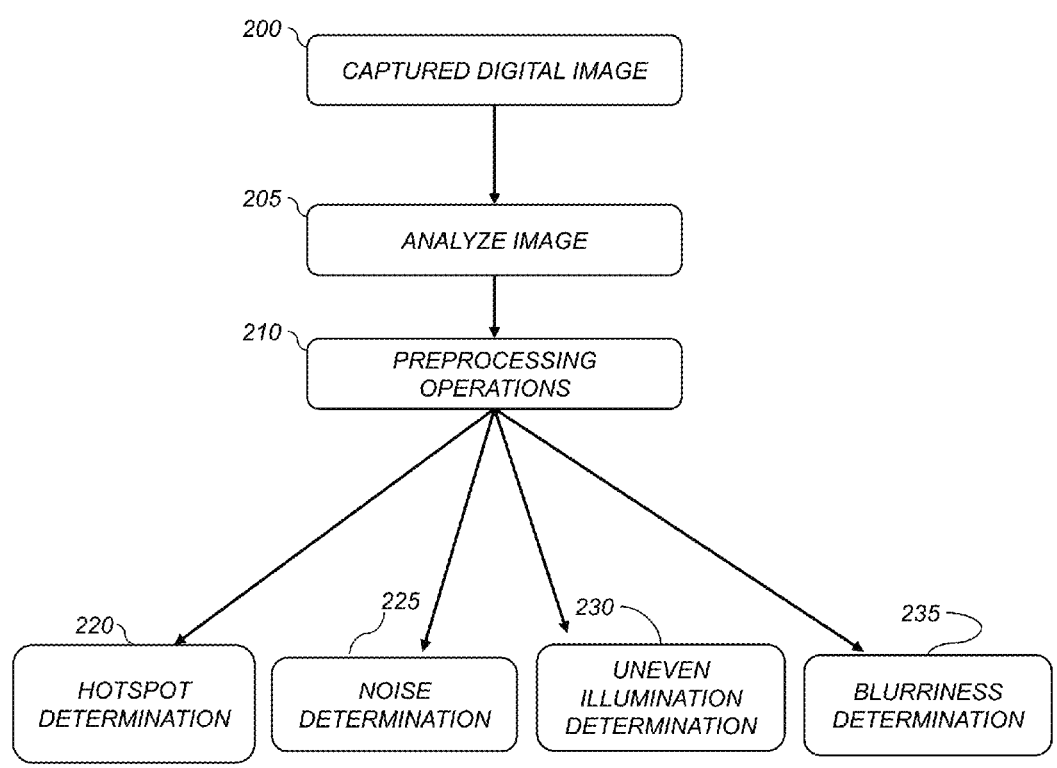
FIG. 2 is a flowchart showing a method of processing the captured digital images and determining the document image quality.

As shown in FIG. 2, a digital image depicting a scene that includes a document is captured 200 using a digital imaging system such as a digital camera or a camera phone. The captured image of the document may be of any image depicted on an appropriate hardcopy of softcopy medium. For example, the documents may be reports, letters, receipts, invoices, magazines, books, newspapers, photographic prints, artwork (e.g., paintings), or content displayed on a television or computer display. The documents can include various types of content including text, graphics and photographic images. Most documents will generally have a rectangular boundary, although the boundary may be geometrically distorted according to the perspective of the digital imaging system and the flatness of the document when the image was captured.

The captured digital image 200 includes an array of image pixels having pixel values. The captured digital image 200 may be analyzed 205 by the system processor to determine if it is a color image having a plurality of color channels (e.g., red (R), green (G) and blue (B) color channels).

Figure 3:
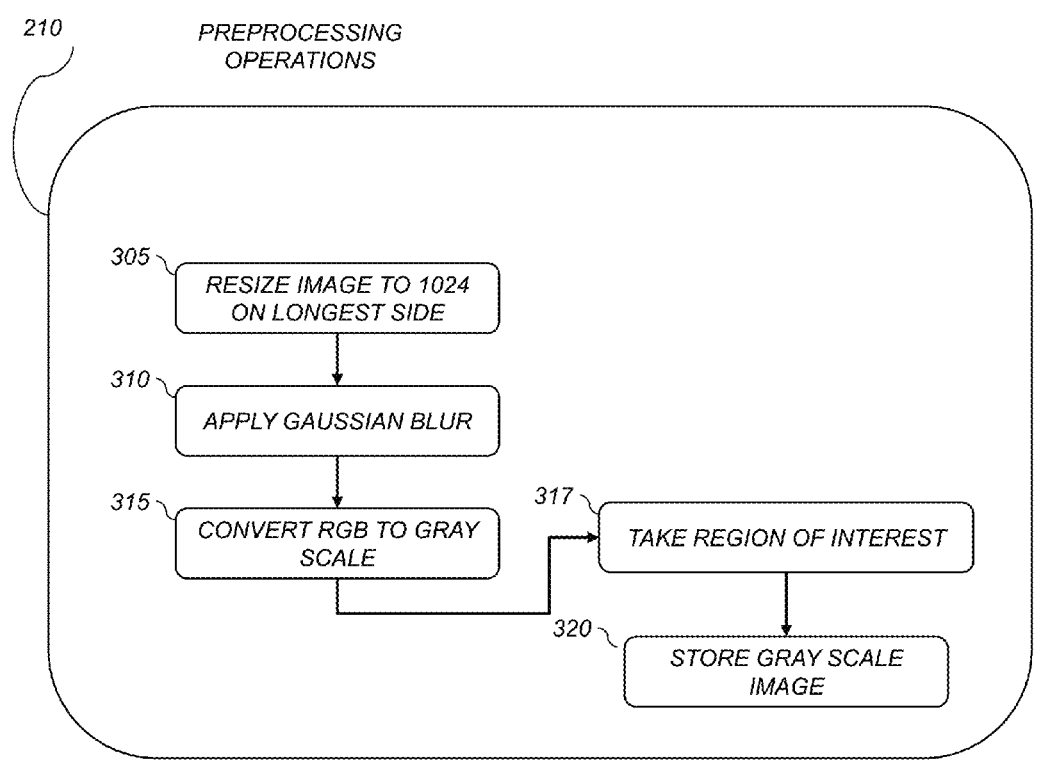
FIG. 3 is a flowchart showing a method of processing the captured digital images and converting them to resized gray scale image.

A number of preprocessing operations 210 including converting the color image to a gray scale image representation are applied to the captured digital image 200 to provide a processed digital image in preparation for further processing. FIG. 3 shows an example of preprocessing operations 210 performed following application of the analysis step 205 in FIG. 2 on a received captured digital image 200 (in an RGB color space) that depicts a document to convert from the RGB color space to a single channel gray scale. The preprocessing operations 210 may include a resize digital image to a longest side of 1024 step 305, a Gaussian blur step 310, a conversion from a color space to a gray scale space image step 315. When the captured image is already in grayscale or black and white, this conversion process may not be necessary. The resize digital image step 305 is used to reduce the size of the captured digital image 200 in order to reduce the memory requirements and increase the computational efficiency of the remaining steps. In systems with advanced processor, this reduction step may not be necessary if the processing and memory components are sufficient to handle the full sized images. The reduced size should be large enough to enable an accurate detection of the document boundary. For example, the resize digital image step 305 may reduce the size of the captured digital image so that the largest dimension of the image is about 1000 pixels (e.g., 1024 pixels). Alternatively, the image may simply be resized by a fixed resize factor (e.g., 25%). Image resizing methods typically involve applying interpolation processes such as bilinear, bicubic or nearest-neighbor interpolation. The captured digital image 200 can optionally be convolved with an appropriate anti-aliasing filter before the interpolation process is applied to reduce the formation of aliasing artifacts (e.g., "jaggies") during the resizing process.

The color space conversion step 315 performs a color space conversion to convert the image data to an appropriate gray scale space 315. This may be done, for example, by converting the image date to the GRAY color space, which is a color space having a single gray (G) color channel. The "gray" color channel is related to the luminance (or lightness) of the image. Using the GRAY color space has the desirable characteristic that the channel relates to overall luminance and does not rely on color information. After the RGB to gray scale conversion 315 is completed, a region of interest is taken 317 that is used for subsequent analysis. The region of interest may be a center region of interest, the whole image, or any other desired portion of the image to be analyzed. In particular, a center region of interest may be taken by cropping off a certain percentage of the edges of the image, thereby reducing the height and width of the image that will be processed. The region of interest is then stored as a gray scale image at 320 for further processing. Since the document being captured is likely to be near the center of the captured digital image 200, the information in proximity to the edges of the image may not necessary and by discarding this information, processing will be faster. Before discarding the information from the edge of the documents, the processor may first perform a check to determine if the edges of the image appear to contain text or other features that would be of interest in subsequent processing as described below. The stored gray scale image 320 may be a plane of two-dimensional pixels making up the image, with each pixel having a value related to luminescence (or brightness).

Returning to FIG. 2, after the region of interest has been stored as a gray scale image 320 to be used for subsequent processing in step 210 (as detailed in FIG. 3), the method then implements steps to check for certain defects in the captured image. These include a hotspot determination 220, a noise determination 225, an uneven illumination determination 230, and a blurriness determination 235.

A hotspot determination 220 may be performed to detect the presence of a hotspot in the image. A hotspot is a high level pixel grouping in the image that usually leads to a loss of information in the region. If there is a loss of information in the captured document, the extraction of the information becomes impossible for the OCR engine and the captured image could not be used to extract the text of the document.

Figure 4:
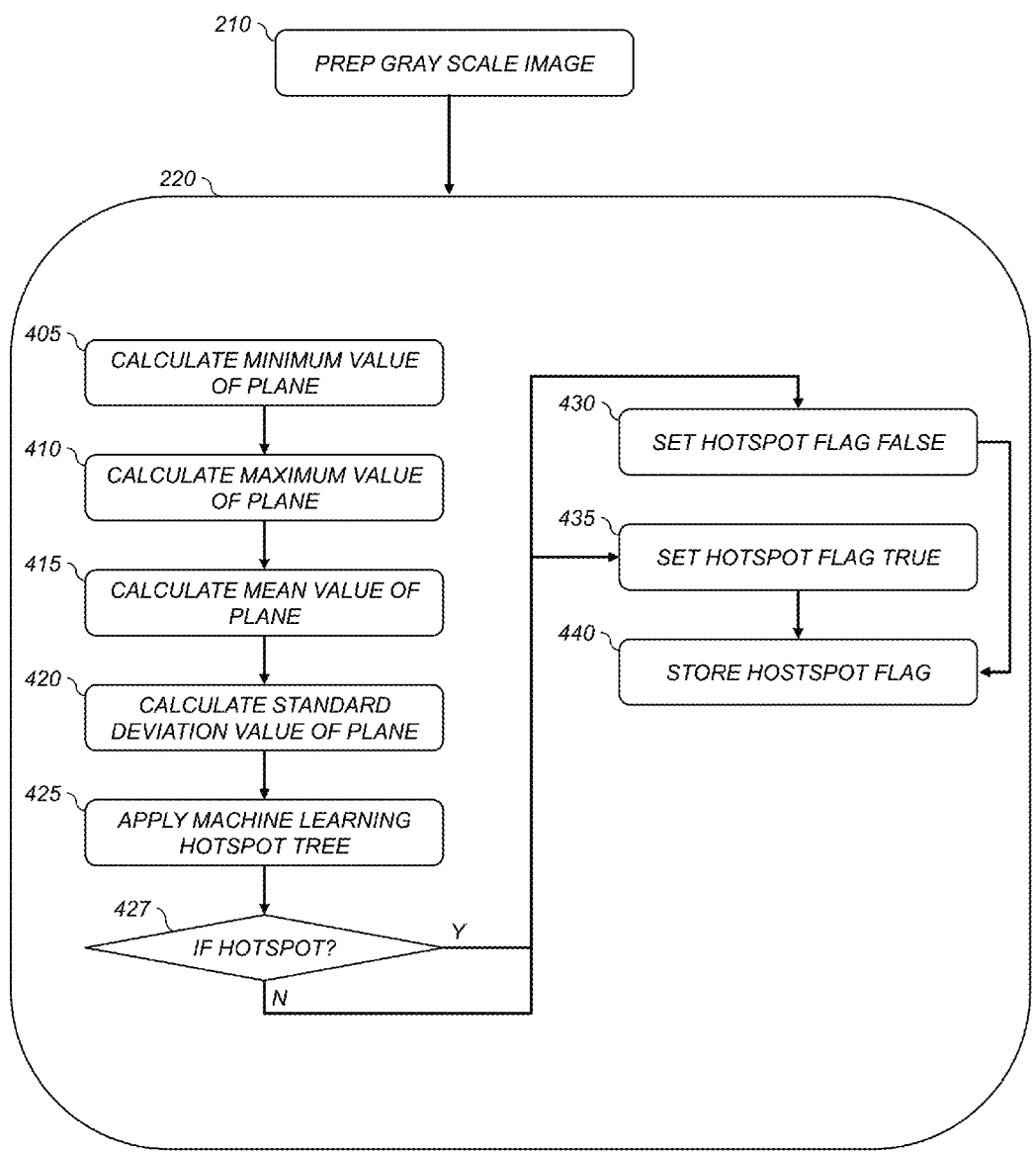
FIG. 4 depicts the details of the processing step of determining the presence of a hotspot in the method of FIG. 2.

The hotspot determination step 220 is used to measure whether a hotspot is present in the stored gray scale image 320 from preprocessing 210. FIG. 4 illustrates a detailed representation of the steps involved in the hotspot processing 220 in FIG. 2. Several statistics of the image information are computed for use in a machine learning classifier, including minimum value, maximum value, mean value, and standard deviation. The pixel with the minimum value in the plane of pixels 405 making up the gray scale image is calculated by iteratively comparing the value of each pixel within the plane. The value of the first pixel examined is initially stored as the minimum value. Then the system iteratively checks the value of every other pixel within the system. If a checked pixel value is less than the currently stored minimum, then the stored minimum is replaced with the pixel value. As shown below, the process of determining the minimum pixel value in the image may begin by setting stored minimum of infinity. Then, a first pixel in the gray scale image would be checked, and since its value would necessarily be less than infinity, its value replaces "infinity" as the currently stored minimum. Then, the system then iteratively checks the value each pixel in the image, and compares it to the currently stored minimum. If the value of a pixel is less than the currently stored minimum, it becomes the new currently stored minimum that all remaining pixels are compared to in the iterative process. Once the values of all pixels have been checked, the final stored minimum value pixel is determined to be the minimum value for the image. Minimum Identification Process:

```
min=infinity
for each value in gray scale image
    if value < min
        min = value
```

Similarly, a maximum value of the plane 410 is calculated by iteratively comparing values of each pixel in the image. As with the determination of a minimum value, the system checks a first pixel and sets its value as the currently stored maximum value. Then, a second pixel is checked and compared against the value of the first pixel, and the second pixel value becomes the currently stored maximum if it is greater. If it is less than the currently stored maximum, the stored value does not change and the next pixel checked is again compared against the stored value of the first pixel. The pixels in the image are iteratively analyzed, and the currently stored maximum value is updated each time a pixel checked has a greater value than the stored value. If the value of a pixel is greater than the currently stored maximum, it becomes the new currently stored maximum that all remaining pixels are compared to in the iterative process. Once the values of all pixels have been checked, the final stored maximum value pixel is determined to be the maximum value for the image.
Maximum Identification Process:

```
max=0
for each value in gray scale image
    if value > max
        max = value
```

The mean value of the plane 415 is calculated by summing each pixel value and, when all pixel values have been summed, the resulting sum is divided by the number of pixel values in the entire image. The result is the mean or average value of the plane 415.
Mean Identification Process:

```
sum=0
for each value in gray scale image
    sum = sum + value
end
mean = sum / num of values in gray scale image
```

The standard deviation value of the plane 420 is calculated by first determining, for each pixel in the image plane, the difference between the pixel value and the mean value of the plane 415, and squaring each result. Then, the square root of the mean value of the calculated differences is determined, providing a standard deviation value of the plane 420.
Standard Deviation Identification Process:

```
sum=0
for each value in gray scale image
    sum = squared(value − mean)
end
stdDev = squareRoot(sum / (num of values in gray scale image − 1))
```

Referring back to FIG. 4 the values for minimum, maximum, mean, and standard deviation are used to calculate the hotspot value by applying a machine learning tree. The tree is a decision tree that is a series of comparisons of an input value versus a preset value that is determined via a training method. The training programs can be implemented in programs such as Matlab, R statistical programs, or any other commercially developed or open source programs. The training process begins by capturing a set of images that are known to contain blurriness, hotspots, noise, and/or uneven illumination. Another set of images is captured that do not contain any blurriness, hotspots, noise, or uneven illumination. The first set is considered the failure set and the second set is considered the success set. Next, the blurriness, hotspots, noise, and/or uneven illumination values for all the images are measured and the images are labeled either via tagging or in a separate file such as a spreadsheet containing no defects, blurriness, hotspots, noise, and/or uneven illumination. All the images are also labelled with either a pass value or a fail value, based on whether the extent of the defects renders the image unusable for further processing.

The training of the machine learning tree may be done using Classification and regression trees, commonly abbreviated as CART. By presenting a series of images that contain the values for blurriness, hotspots, noise, or uneven illumination and also presenting a series of images that do not contain any problems, in addition to the pass/fail value, the machine learns the appropriate patterns and generates a tree that is used to classify an unknown image value.

Figure 9:
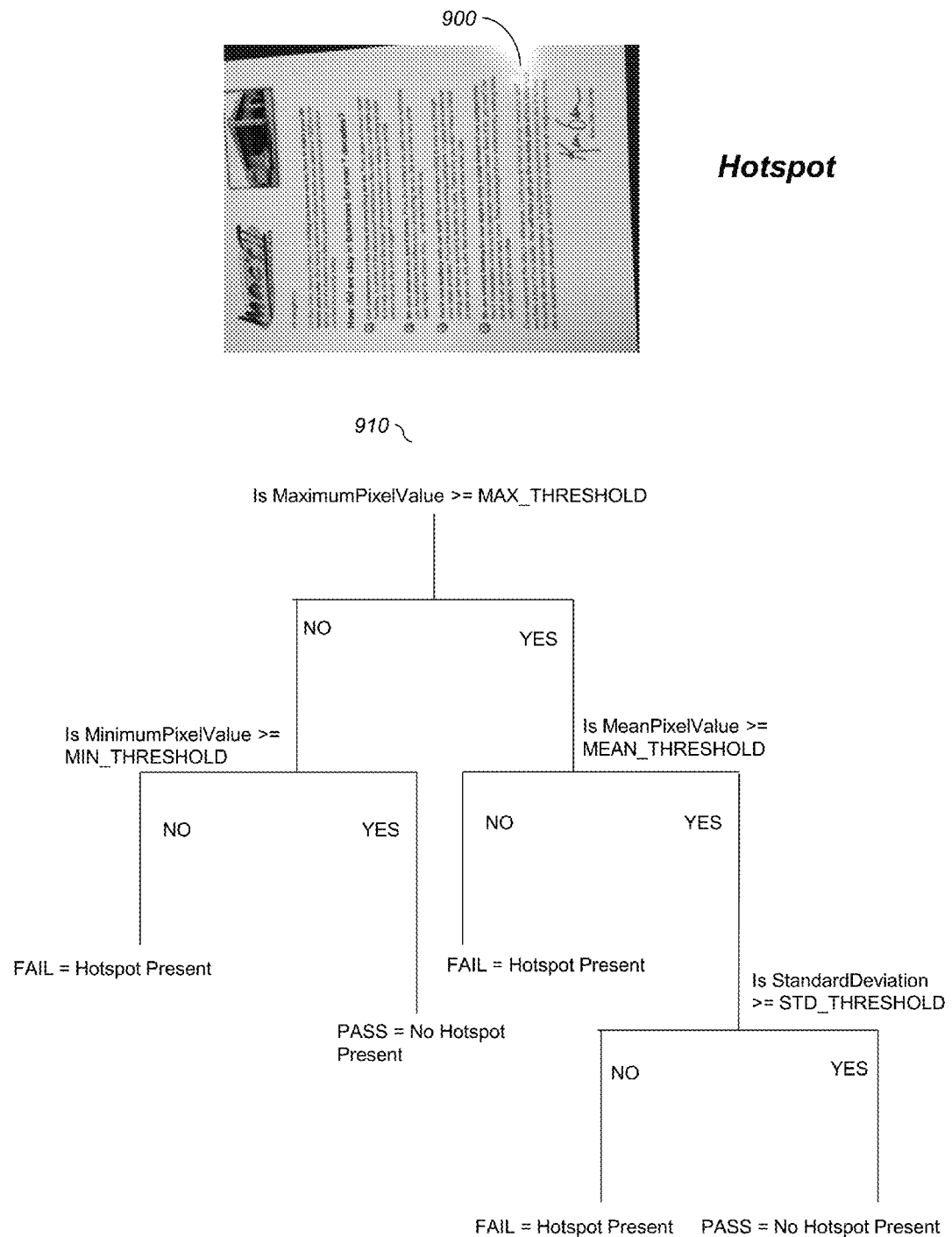
FIG. 9 depicts the processing steps that are used to calculate the hotspot metric in the method of FIG. 2.

FIG. 9 is contains an example of an image with a hotspot 900. A decision tree has been determined using an R statistical modeling program and the tree is represented in 910. As indicated above, other programs such as a neural network, support vector machine, S Plus, or MatLab may be used to establish the decision tree to detect hotspots. In the decision tree 910, a determination is first made as to whether the maximum pixel value in the image is greater than or equal to a predetermined threshold value.

If the maximum value in the image is greater than the threshold value, a determination is made as to whether the mean pixel value is greater than or equal to a predetermined mean threshold value. If not, it is determined that a hotspot is present and a "fail" is indicated for the image. If the mean pixel value is greater than or equal to the threshold value, a further determination is made as to whether the standard deviation is greater than or equal to a predetermined threshold value. If it is, it is determined that the image does not contain a hotspot and a "pass" is indicated. If it is not, it is determined that a hotspot is present and a "fail" is indicated.

When the maximum pixel value in the image is less than the threshold, a determination is made as to whether the minimum pixel value in the image is greater than or equal to a predetermined minimum threshold. If it is, it is determined that the image does not contain a hotspot and a "pass" is indicated. If it is not, it is determined that a hotspot is present and a "fail" is indicated. When the output of the decision tree 910 is a "pass," the hotspot condition for image is considered to be true. When the output of the decision tree 910 is a "fail," the hotspot condition for the image is considered to be false. As shown in FIG. 4, in the event that the hotspot decision tree returns false 430, the hotspot flag is stored as false 440. In the event that the hotspot decision tree returns true 435, the hotspot flag is stored as true 440.

Figure 5:
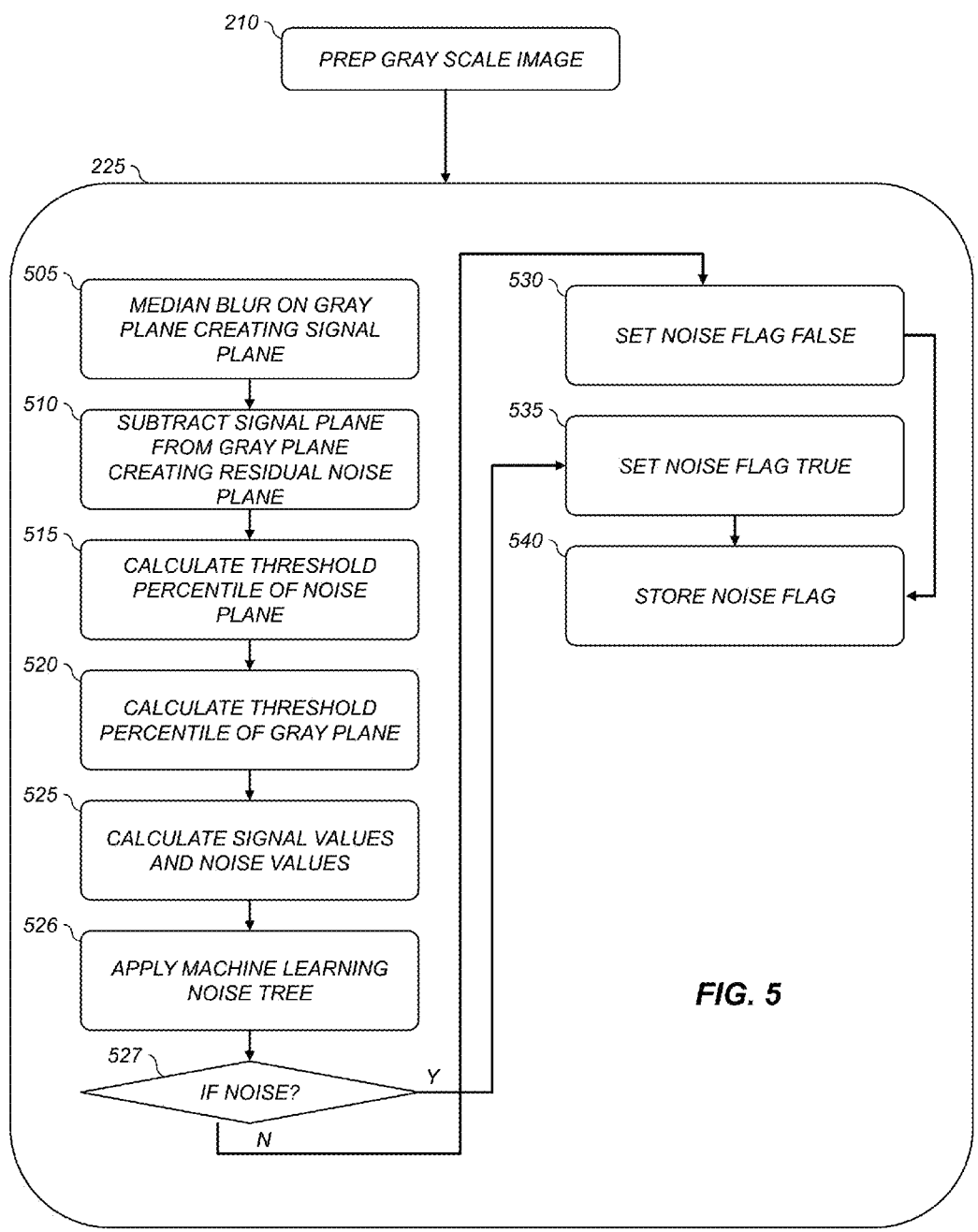
FIG. 5 depicts the details of the processing step of determining the presence of noise in the method of FIG. 2.

Referring back to FIG. 2, another processing step that may be performed on the stored gray scale image 320 is a determination of the presence of noise 225. FIG. 5 illustrates the details in the processing step of determining the presence of noise 225 in FIG. 2. As seen in FIG. 5, at 505 a median blur is applied to the gray scale image plane, creating a signal plane. This median blur may be applied using a median filter, such as a 3×3 median filter. At step 510, the signal plane is subtracted from the gray scale image plane, creating a residual noise plane. A percentile of the noise in the residual noise plane, such as 90%, is then calculated at 515. At step 520, a threshold percentile of the signal in the gray scale image is determined, and at 525 signal and noise values for the image are determined. A machine learning noise tree is applied at 526 to determine if there is excessive noise in the image. If the noise value is greater than a predetermined noise threshold value and the signal value is greater than a predetermined signal threshold value, then the image contains excessive noise.] A check is performed to determine if the image contains noise at 527. If it is determined that noise is present, a noise flag is set as true at 535. If it is determined that there is no blurriness, then the noise flag is set as false at 530. The noise flag, set as either true or false, is then stored at 540.

Figure 10:
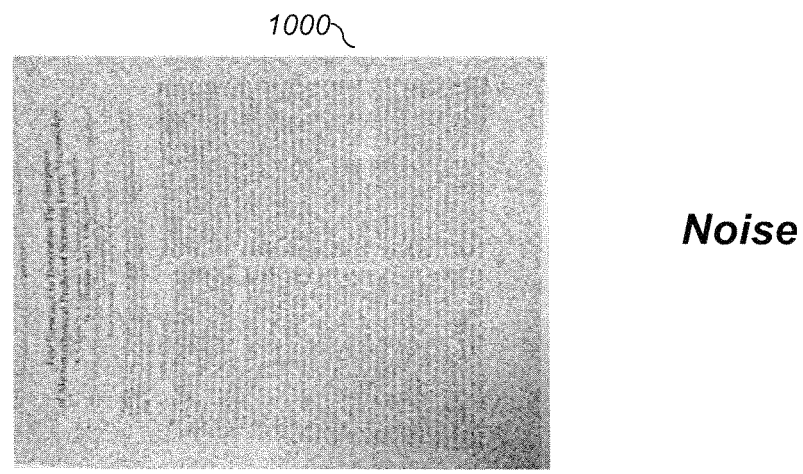
FIG. 10 depicts the processing steps that are used to calculate the noise metric in the method of FIG. 2.
Figure 10:
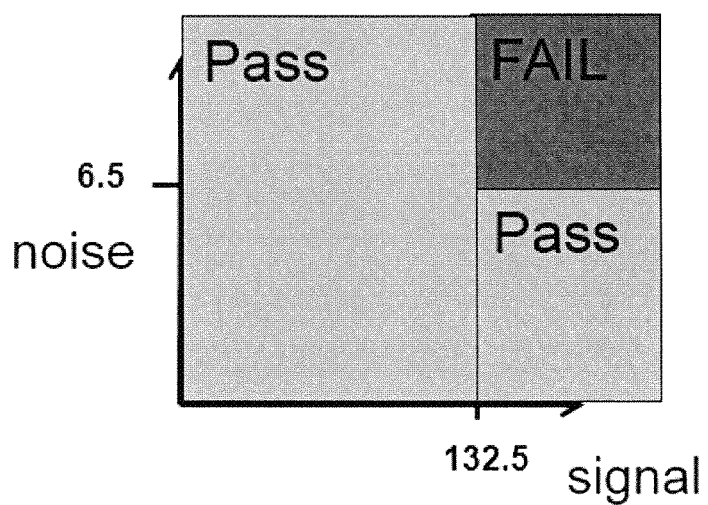

FIG. 10 illustrates an example of an image of a document containing noise, as well as the decision tree and processing involved in determining whether regions of the document in the image have noise. As seen in FIG. 10, the image of the document 1000 contains portions that may be obscured by noise. A decision tree may be implemented to determine if a region of the image comprises too much noise. As seen in 1010, the decision tree may comprise threshold levels for noise and signal values, with pass and fail regions designated based on whether the signals are above or below one or both of the thresholds. For example, a noise threshold of 6.5 and a signal threshold of 132.5 may be set. A document image with a signal value below the 132.5 threshold could be considered acceptable, regardless of the noise value. Similarly, a document image with a noise value less than 6.5 could be considered acceptable, regardless of the signal value. However, as shown in 1010, when the document image has both a signal value above the signal threshold and a noise level above the noise threshold, it falls within the "fail" region of the decision tree and the document image is indicated as having unacceptable noise.

Figure 6:
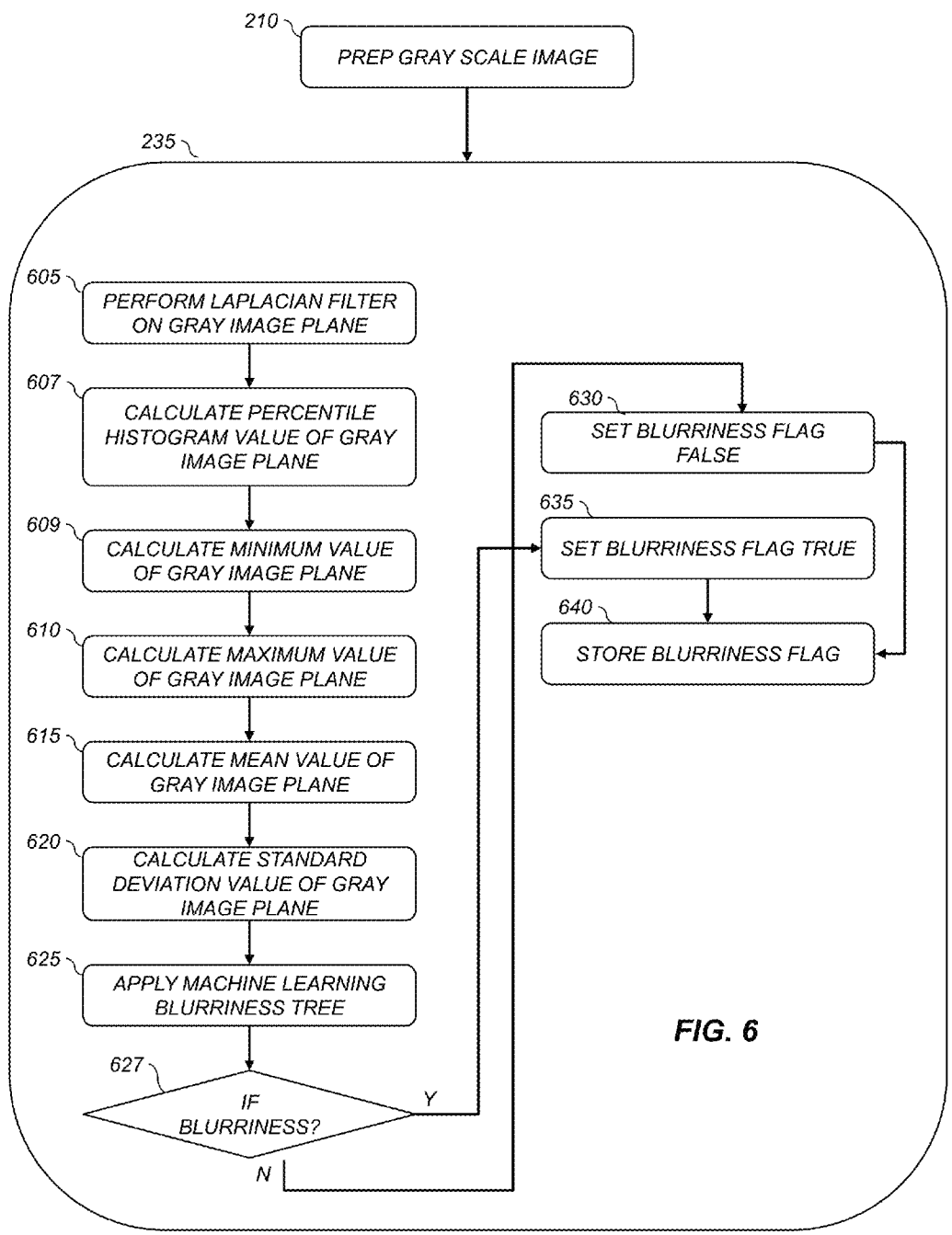
FIG. 6 depicts the details of the processing determining the presence of blurriness in the method of FIG. 2.
Figure 7:
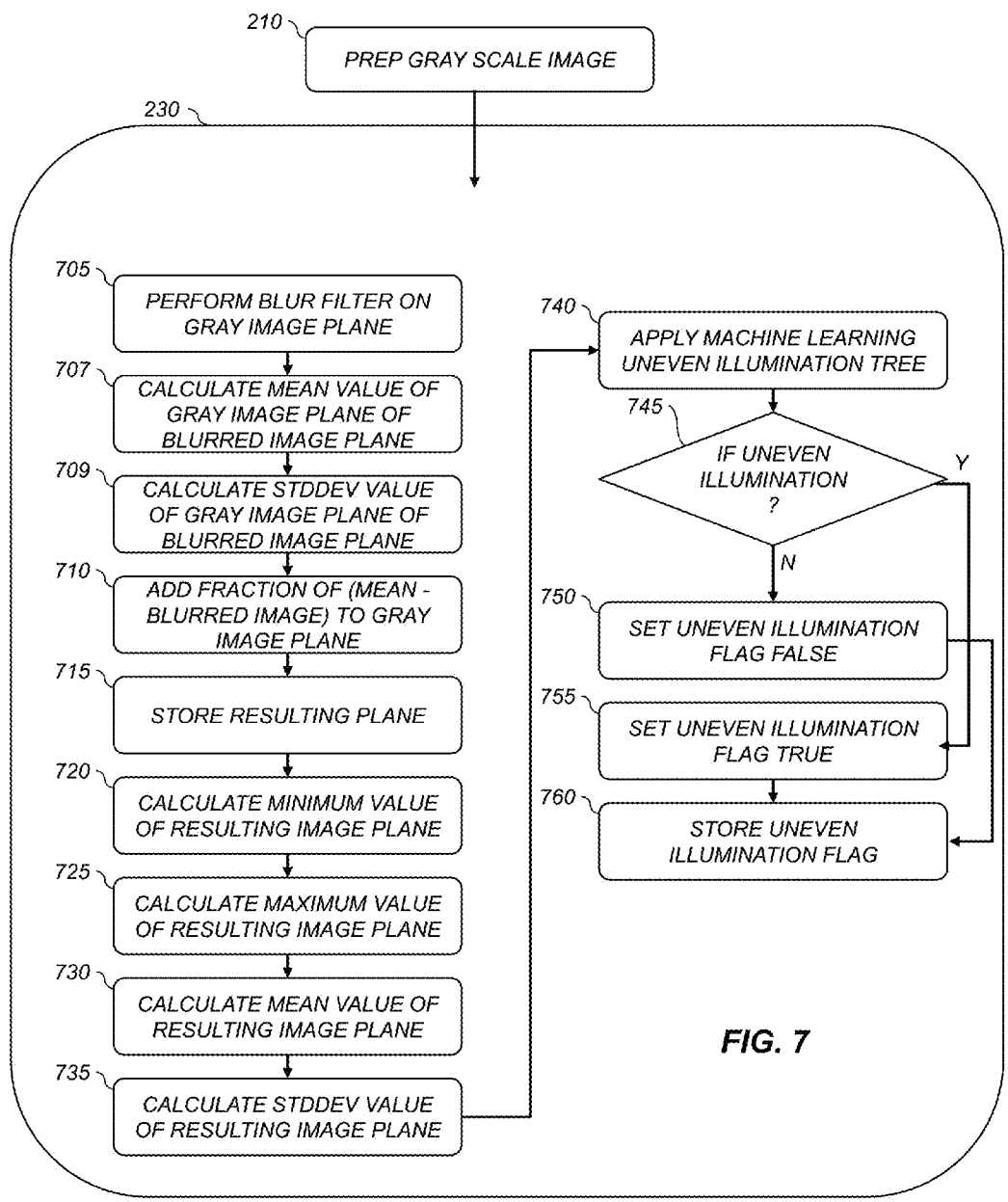
FIG. 7 depicts the details of the processing of determining the presence of uneven illumination in the method of FIG. 2.
Figure 11:
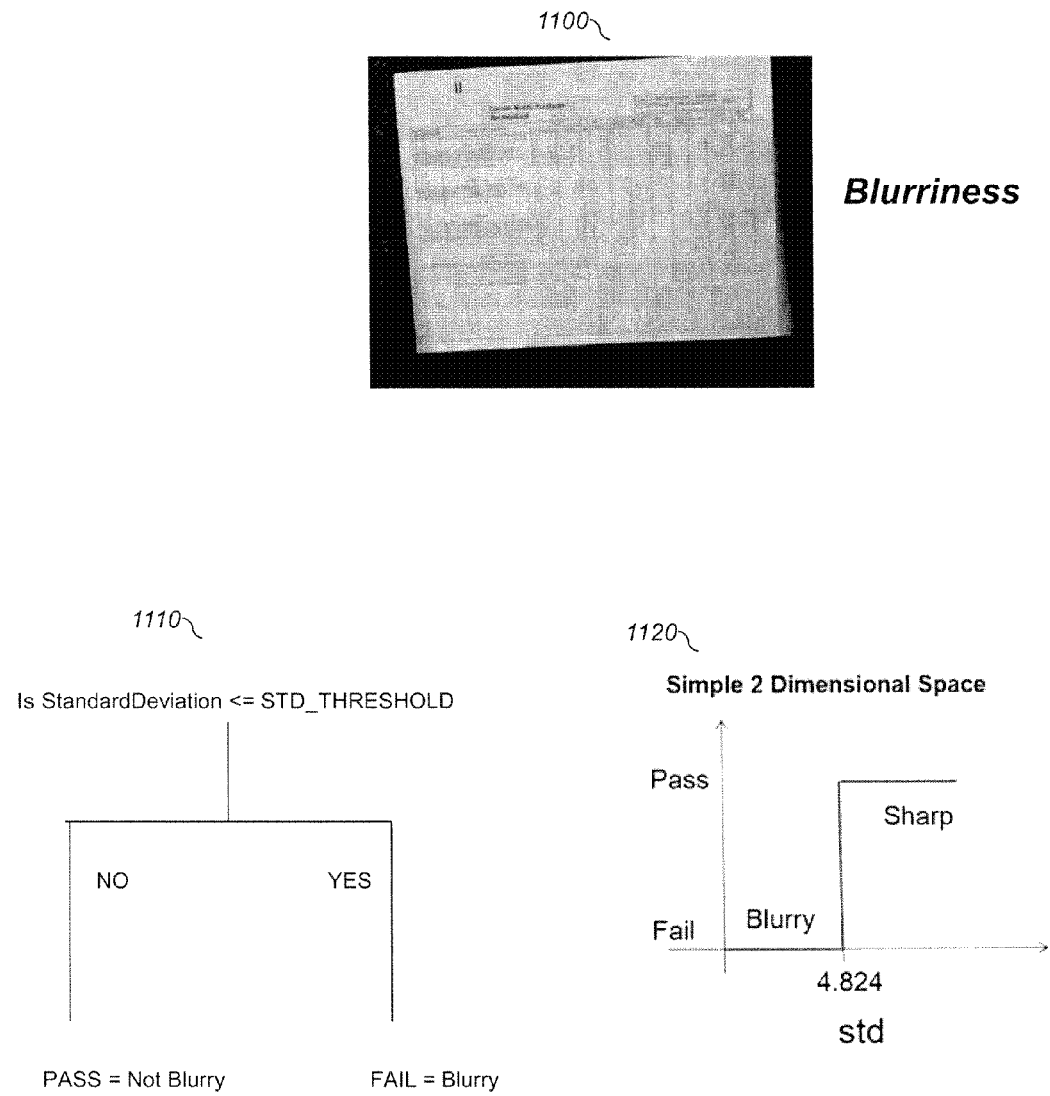
FIG. 11 depicts the processing steps that are used to calculate the blurriness metric in the method of FIG. 2.

Again referring back to FIG. 2, a blurriness determination 235 may also be performed on the stored gray scale image 320. FIG. 6 illustrates the details in the processing step of determining the presence of blurriness 235 in FIG. 2. As seen in FIG. 6, a Laplacian filter is performed at 605 on the stored gray scale image 320. Then, the system calculates a certain threshold percentile histogram value of the gray scale image plane at 607. To calculate a histogram, the values in the image are iterated over all the columns and rows of pixels making up the image. For each value, a count is kept. When all the values have been examined and counted, a histogram is generated. The certain threshold percentile is the histogram value where that percent of total number of elements have been counted. For example, a $90^{th}$ percentile histogram value would be the value at which 90 percent of the pixels would be counted. At steps 609 and 610, minimum and maximum values of the gray scale image plane are calculated, as detailed above with respect to FIG. 4. At 615 and 620, the mean value and standard deviation values of the gray scale image plane are calculated, using the same techniques as detailed above with respect to FIG. 4. At step 625, a blurriness learning tree is applied, which checks to see if the calculated standard deviation is above or below a predetermined value. The details of this learning tree are shown in FIG. 11, which illustrates an example of an image of document containing blurriness 1100. Applying the learning tree at 1110, the system checks to see if the calculated standard deviation is above or below the predetermined value. If the standard deviation is above the value, the gray scale image is presumed to be sharp, and a "pass" is indicated by the decision tree. However, if the standard deviation is below the predetermined value, the image is presumed to be blurry, and a "fail" is indicated by the decision tree. Graph 1120 in FIG. 11 illustrates the outcomes of the decision tree for calculated standard deviations above and below the predetermined value. Referring back to FIG. 6, at step 627 the system determines if the gray scale image contains unacceptable blurriness. This determination is based on the "pass" or "fail" outcomes from the decision tree are used to set a blurriness flag as either "true" or "false." As seen in FIG. 2, if it is determined that there is unacceptable blurriness, then a blurriness flag is set to "true" at 635. If it is determined that there is not unacceptable blurriness, then a blurriness flag is set to "false" at 630. The blurriness flag, set as either "true" or "false" is then stored at 640. Again referring back to FIG. 2, an uneven illumination determination 230 may also be performed on the stored gray scale image 320. FIG. 7 illustrates the details in the processing step of determining the presence of uneven illumination 230 in FIG. 2. As seen in FIG. 7, at 705 a Gaussian blur filter is applied to the gray scale image to create a blurred image plane. At 707 and 709, the mean value and standard deviation of the blurred image plane is determined, using the method described above in FIG. 4. Then, at 710, a fraction of the mean-blurred image plane is added to the stored gray scale image plane 320. To do this, the blurred image is subtracted from the mean, and a certain fraction of the result is taken. This fraction is then added back to the stored gray scale image plane to form a resulting image plane. The fraction may be fixed (for example, 0.75 or 75 percent), or may vary depending on the characteristics of the particular image being analyzed. FIG. 13 illustrates an example of this process. The resulting image plane from this addition is then stored at 715. The minimum value, and maximum value, mean, and standard deviation of the resulting image plane are determined at steps 720, 725, 730, and 735, using the process described above with respect to FIG. 4. A machine learning tree is applied at 740. The machine learning tree checks to determine if the maximum value of the resulting image plane 715 is greater than a predetermined value. If so, the captured image is considered to have uneven illumination. An example of this machine learning tree is illustrated at 1210 in FIG. 12.

FIG. 12 also illustrates an example of an image of a document 1200 having uneven illumination. Based on the outcome of the learning tree 740 from FIG. 7, the system checks to see if there is uneven illumination in the image of the document at 745. If it is determined that uneven illumination is not present, an uneven illumination flag is set to "false" at 750. However, if it is determined that there is uneven illumination, then the uneven illumination flag is set to "true" at 755. The set uneven illumination flag is then stored at 760.

Figure 8:
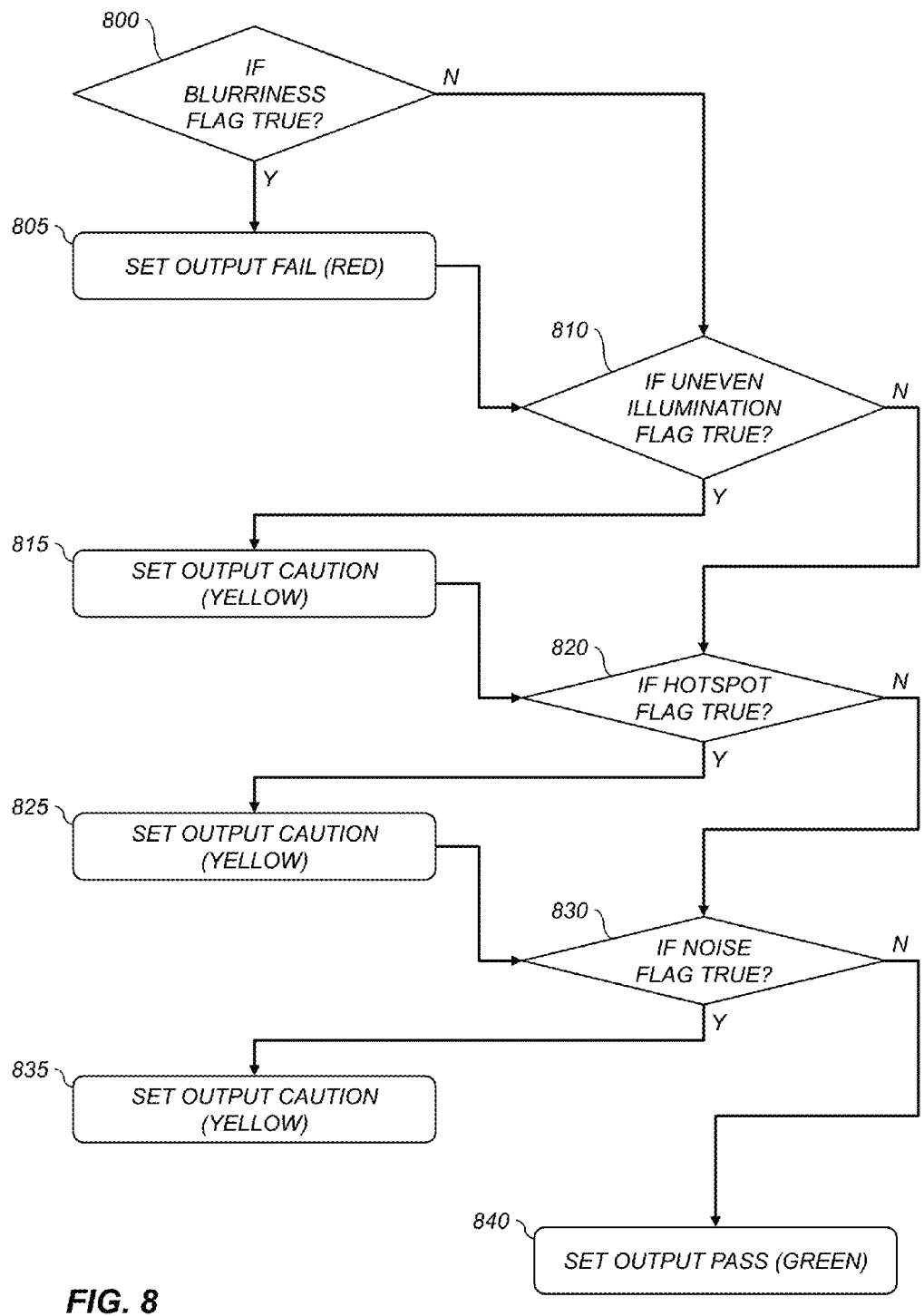
FIG. 8 depicts an additional processing step that uses the metrics (hotspot, blurriness, noise, and uneven illumination) to create a STOP/CAUTION/GO indicator.

FIG. 8 illustrates processing that may be performed following the hotspot determination 220, noise determination 225, uneven illumination determination 230, and blurriness determination 235. As seen in FIG. 8, a signal can be provided to the processing system that conforms to a standard traffic light representation. If the blurriness flag is set to true 800, the processing system may set an output to FAIL 805 and the digital camera system can display a RED or STOP indicator to the user, suggesting that the user should retake the image before leaving. Since blurriness is considered a failure mode operation for optical character recognition. If the uneven illumination flag is true 810, the output is set to CAUTION which the digital camera system can display as a YELLOW indicator 815 to the user. The YELLOW indicator provides the user with a signal that they should check the captured image to make sure its quality its sufficient for the desired post-processing, giving the user notice that retaking the image may be necessary. Following on, if the hotspot flag is set to true 820, the digital camera system can display as a YELLOW indicator 815 to the user. Following on, if the noise flag is set to true 830, the client application can display as a YELLOW indicator 815 to the user. If none of the flags are true (blurriness, noise, uneven illumination, or hotspot), the client application can display a GREEN indicator 840 to the user to give the user feedback that the image captured is acceptable for post processing. By providing this feedback, the system allows a digital camera or mobile device including a camera to be used as a convenient portable document scanner. The feedback as to whether the image quality is acceptable for post processing, unacceptable for post processing, or potentially unacceptable for post processing may be provided by visual or audio notifications. For example, the display on the digital camera device may show a color coded notification (such as the red, green, and yellow described above, although any colors may be used), icons indicating pass, fail, or caution, or text indicating pass, fail, or caution. The notification may also be provide by an audible tone or alert. For example, different tones or different sequences of tones may be used to indicate pass, fail or caution The methods described herein may be implemented using a computer program product. The computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention claimed is:

1. A system for measuring image quality comprising:
    a digital imaging system configured to capture an image;
    a data storage system configured to store the captured image as a gray scale image;
    a processing system configured to access the stored gray scale image, wherein the processing system includes several processing modules, including:
        a hotspot detector configured to detect the presence of a hotspot in the stored gray scale image and to set a hotspot flag as true if a hotspot is detected;
        a noise detector configured to detect the presence of noise in the stored gray scale image and to set a noise flag as true if noise is detected;
        an uneven illumination detector for detecting the presence of uneven illumination in the stored gray scale image and to set an uneven illumination flag as true if uneven illumination is detected; and
        a blurriness detector configured to detect the presence of blurriness in the stored gray scale image and to set a blurriness flag as true if blurriness is detected; and
    an output indicator configured to notify a user if any flags were set as true by the hotspot detector, noise detector, uneven illumination detector, or blurriness detector.

2. The system of claim 1, wherein the captured image further comprises text.

3. The system of claim 1, wherein the captured image further comprises a color image, and wherein the processing system is further configured to convert the color image into the gray scale image.

4. The system of claim 1, wherein said hotspot detector is configured to:
    determine a minimum value of the pixels in the stored gray scale image;
    determine a maximum value of the pixels in the stored gray scale image;
    determine a mean value for the stored gray scale image;
    determine a standard deviation for the stored gray scale image; and
    evaluate the maximum value, minimum value, mean value, and standard deviation to determine whether a hotspot is present.

5. The system of claim 1, wherein the noise detector is configured to:
    apply a median blur to an image plane of the stored gray scale image to create a signal plane;
    subtract a signal plane from the image plane to create a residual noise plane;
    determine signal and noise values for the stored gray scale image; and
    determine whether there is noise present in the stored gray scale image.

6. The system of claim 5, wherein determining if noise is present comprises:
    determining whether the signal value is above a signal threshold; and
    determining whether the noise value is above a noise threshold.

7. The system of claim 1 wherein the uneven illumination detector is further configured to:
    create a blurred image plane;
    determine a mean of the blurred image plane;
    determine a standard deviation of the blurred image plane;
    subtract the mean of the blurred image plane from the blurred image plane, and configured to add a fraction of that result to the stored gray scale image to create a calculated image plane;
    determine a maximum value of the calculated image plane;
    determine a minimum value of the calculated image plane;
    determine a mean value of the calculated image plane;
    determine a standard deviation of the calculated image plane; and
    determine whether the stored gray scale image has uneven illumination.

8. The system of claim 7, wherein determining whether the stored gray scale image has uneven illumination image comprises:
    determining whether the maximum value in the calculated image plane is greater than a threshold value.

9. The system of claim 1, wherein the blurriness detector is configured to:
    calculate a threshold percentile histogram value of the stored gray scale image;
    determine a minimum value of the pixels in the stored gray scale image;
    determine a maximum value of the pixels in the stored gray scale image;
    determine a mean value of the stored gray scale image;
    determine a standard deviation of the stored gray scale image; and
    determine whether the stored gray scale image is blurry.

10. The system of claim 9, wherein determining whether the stored gray scale image is blurry comprises:
    evaluating whether the standard deviation of the stored gray scale image is less than or equal to a threshold.

11. The system of claim 1, wherein the output indicator is configured to indicate:
    a failure state if the blurriness flag is set as true;
    a caution state if the uneven illumination flag is set as true;
    a caution state if the hotspot flag is set as true;
    a caution state if the noise flag is set as true; and
    a pass state if no flags are set as true.

12. A system for measuring image quality comprising:
    a digital imaging system configured to capture an image;
    a data storage system configured to store the captured image as a gray scale image;
    a processing system configured to access the stored gray scale image, wherein the processing system includes a blurriness detection module, the blurriness detection module configured to detect a presence of blurriness in the stored gray scale image; and
    an output indicator configured to notify a user of a fail condition if blurriness is detected.

13. The system of claim 12, further comprising:
a hotspot detector configured to detect the presence of a hotspot in the stored gray scale image;
a noise detector configured to detect the presence of noise in the stored gray scale image; and
an uneven illumination detector for detecting the presence of uneven illumination in the stored gray scale image.

14. The system of claim 13, wherein the output indicator is further configured to indicate:
a caution state if an uneven illumination is detected;
a caution state if a hotspot is detected;
a caution state if a noise is detected; and
a pass state if no blurriness, noise, hotspot, or uneven illumination is detected.

15. A method for measuring image quality comprising:
capturing a digital image with a digital imaging system;
storing the captured image as a gray scale image within a data storage system;
accessing the stored gray scale image with a processing system, wherein the processing system:
 detects the presence of a hotspot in the stored gray scale image and sets a hotspot flag as true if a hotspot is detected;
 detects the presence of noise in the stored gray scale image and sets a noise flag as true if noise is detected;
 detects the presence of uneven illumination in the stored gray scale image and sets an uneven illumination flag as true if uneven illumination is detected;
 detects the presence of blurriness in the stored gray scale image and sets a blurriness flag as true if blurriness is detected; and
notifying a user with an output indicator if the hotspot, noise, uneven illumination, or blurriness flags were set as true.

16. The method of claim 15 wherein the captured image further comprises text.

17. The method of claim 15 wherein the captured image further comprises a color image, and wherein the color image is converted into a gray scale image with a processing system.

18. The method of claim 15 wherein detecting a hotspot further comprises:
determining a minimum value of pixels in the stored gray scale image;
determining a maximum value of pixels in the stored gray scale image;
determining a mean value for the stored gray scale image;
determining a standard deviation for the stored gray scale image; and
evaluating the maximum value, minimum value, mean value, and standard deviation to determine whether a hotspot is present.

19. The method of claim 15 wherein detecting the presence of noise further comprises:
applying a median blur to an image plane of the stored gray scale image to create a signal plane;
subtracting a signal plane from the image plane to create a residual noise plane;
determining signal and noise values for the stored gray scale image; and
determining whether there is noise present in the stored gray scale image.

20. The method of claim 19 wherein determining if noise is present comprises:
determining whether the signal value is above a signal threshold; and
determining whether the noise value is above a noise threshold.

21. The method of claim 15 wherein detecting the presence of uneven illumination further comprises:
creating a blurred image plane;
determining a mean of the blurred image plane;
determining a standard deviation of the blurred image plane;
subtracting the mean of the blurred image plane from the blurred image plane, and adding a fraction of that result to the stored gray scale image to create a calculated image plane;
determining a maximum value of the calculated image plane;
determining a minimum value of the calculated image plane;
determining a mean value of the calculated image plane;
determining a standard deviation of the calculated image plane; and
determining whether the stored gray scale image has uneven illumination.

22. The method of claim 21, wherein determining whether the stored gray scale image has uneven illumination comprises:
determining whether the maximum value in the calculated image plane is greater than a threshold value.

23. The method of claim 15, wherein detecting the presence of blurriness further comprises:
calculating a threshold percentile histogram value of the stored gray scale image;
determining a maximum value of pixels in the stored gray scale image;
determining a minimum value of pixels in the stored gray scale image;
determining a mean value of the stored gray scale image;
determining a standard deviation of the stored gray scale image; and
determining whether the stored gray scale image is blurry.

24. The method of claim 23, wherein determining whether the stored gray scale image is blurry comprises:
evaluating whether the standard deviation is less than or equal to a threshold.

25. The method of claim 15, wherein notifying a user with an output indicator comprises indicating:
a failure state if the blurriness flag is set as true;
a caution state if the uneven illumination flag is set as true;
a caution state if the hotspot flag is set as true;
a caution state if the noise flag is set as true; and
a pass state if no flags are set as true.

26. A method for measuring image quality comprising:
capturing a digital image with a digital imaging system;
storing the captured image as a gray scale image with a data storage system;
accessing the stored gray scale image with a processing system, wherein the processing system detects a presence of blurriness in the stored gray scale image; and
notifying a user with an output indicator indicating a failure state if blurriness is detected.

27. The method of claim 26, further comprising:
detecting a presence of a hotspot in the stored gray scale image;
detecting a presence of noise in the stored gray scale image; and
detecting a presence of uneven illumination in the stored gray scale image.

28. The method of claim 27, wherein notifying a user with an output indicator further comprises indicating:

a caution state if uneven illumination is detected;
a caution state if a hotspot is detected;
a caution state if noise is detected; and
a pass state if no blurriness, noise, hotspot, or uneven illumination is detected.

* * * * *